United States Patent
Rodrigues et al.

[11] Patent Number: 6,129,317
[45] Date of Patent: *Oct. 10, 2000

[54] SUPPORT SPACER FOR AERIAL CABLE

[75] Inventors: Julio F. Rodrigues; Kenneth R. Dumont, both of Collierville, Tenn.

[73] Assignee: Thomas & Betts International, Inc., Sparks, Nev.

[ * ] Notice: This patent issued on a continued prosecution application filed under 37 CFR 1.53(d), and is subject to the twenty year patent term provisions of 35 U.S.C. 154(a)(2).

[21] Appl. No.: 08/650,417

[22] Filed: May 20, 1996

[51] Int. Cl.[7] ................ F16L 3/00; F16L 3/08; F16L 3/12
[52] U.S. Cl. .......................... 248/74.3; 248/49
[58] Field of Search ............... 248/74.3, 61, 62, 248/63, 49, 68.1, 74.1, 58; 24/16 PB

[56] References Cited

U.S. PATENT DOCUMENTS

| | | | |
|---|---|---|---|
| 3,250,505 | 5/1966 | Rodman, Sr. et al. | 248/49 |
| 3,632,070 | 1/1972 | Thayer | 248/74.3 X |
| 4,395,009 | 7/1983 | Bormke . | |
| 4,397,435 | 8/1983 | Fisher et al. | 248/61 |
| 4,562,982 | 1/1986 | McSherry et al. | 248/61 |
| 4,766,651 | 8/1988 | Kobayashi et al. . | |
| 4,772,519 | 9/1988 | Irvine | 428/542.8 |
| 4,899,963 | 2/1990 | Murphy | 248/74.3 X |
| 4,993,669 | 2/1991 | Dyer | 248/61 |
| 5,083,346 | 1/1992 | Orton . | |
| 5,193,251 | 3/1993 | Fortsch . | |
| 5,279,485 | 1/1994 | Georges . | |
| 5,332,179 | 7/1994 | Kuffel et al. | 248/74.3 |
| 5,538,208 | 7/1996 | Cordes et al. | 248/69 |
| 5,598,995 | 2/1997 | Meuth et al. | 248/61 X |
| 5,954,302 | 9/1999 | Robertson et al. | 248/74.3 |

FOREIGN PATENT DOCUMENTS

| | | | |
|---|---|---|---|
| 004998 | 9/1955 | Germany | 248/68.1 |
| 2217312 | 11/1973 | Germany | 248/74.3 |

Primary Examiner—Ramon O. Ramirez
Assistant Examiner—Jerome A. Deluca
Attorney, Agent, or Firm—Hoffman & Baron, LLP

[57] ABSTRACT

An improved cable spacer for spacing a transmission cable or similar article from a support member such as a support wire is provided. The spacer includes a substantially continuous cable contacting surface and includes drainage holes for preventing water and ice accumulation in the interior portion of the spacer. The spacer may further include openings in the side walls thereof in communication with a passageway provided for passage of a cable tie used in conjunction therewith. Such openings permit accommodation of various sizes of transmission cables without added strain between the spacer and cable tie. A plurality of such spacers of the present invention can be used in a stacked configuration to accommodate any desired spacing between a transmission cable and support wire.

9 Claims, 3 Drawing Sheets

SUPPORT SPACER FOR AERIAL CABLE

FIELD OF THE INVENTION

The present invention relates generally to an improved device used to space a cable or similar article, such as a transmission wire, conduit, or the like, from a support member, such as a support wire. More particularly, the present invention relates to a spacer which includes a substantially continuous cable contacting surface and which includes drainage holes for preventing water and ice accumulation, and which is capable of accommodating various size cables without added strain between the spacer and a cable tie used in conjunction therewith.

BACKGROUND OF THE INVENTION

It has long been known in various industrial applications to secure one elongated object in a spaced relationship to another elongate object running in a parallel direction. For example, it is common practice to suspend elongate transmission articles such as cables, wires, conduits and the like from a support member such as a support wire, cable, conduit or the like. In telecommunications applications such as telephone and cable television transmissions, such support wires commonly extend between two or more poles, with the transmission cable suspended therefrom. Additionally, in such applications, spacers are commonly employed between the transmission cable and the support wire. Securement members such as cable ties and straps are commonly used in conjunction with spacers in such arrangements to secure the transmission cable to the support wire at various locations thereon, typically by wrapping the cable tie about the support wire and the transmission cable, and through the spacer. As may be appreciated, cables supported in this manner can run for substantial lengths with adequate support.

U.S. Pat. No. 4,562,982 discloses an example of a cable spacer used to support and space a cable from an overhead support wire in such a manner. In this patent, an improved spacer is taught in which a cable tie is interposed through the spacer and extends around the cable and the support wire, thus suspending the cable from the support wire. Multiple spacers may be used in stacked relationship to vary the distance between the overhead support wire and the cable which is supported therefrom. The spacers disclosed in this patent include a generally rectangular tubular configuration, with the interior portion of the spacer being generally open for receiving the cable tie or strap therein. With such an open configuration, however, tightening of the cable tie or strap can lead to undesirable deformation of the transmission cable housing. Such deformation can cause degradation of signal transmission, particularly when sensitive transmission articles such as co-axial cables are employed.

In order to compensate for such deformation, it has been proposed to provide such cable spacers with a generally flat surface, for contacting the transmission cable along the entire length of the cable spacer. However, spacers with such continuous contacting surfaces generally create an enclosed internal area of the spacer. When these spacers are exposed to the elements such as in outdoor applications, water can build up within the interior chamber of the spacer. Further, in colder climates, freezing of such built-up water can result in cracking and significant damage to the spacer.

Further, cable spacers with passageways for cable ties or straps extending from the bottom portion thereof, such as those disclosed in U.S. Pat. No. 4,562,982, can cause unwanted strain and abrasion on the cable tie or strap. For instance, when transmission cables with diameters larger than the width of the spacer are used, in order for the cable tie to exit the spacer passageway at the bottom portion thereof and wrap around the transmission cable, the cable tie must contact the lower edge of the spacer at a significant angle. Such contact causes abrasion and stress on the cable tie, and can lead to wearing away and possible failure of the cable tie.

Thus, it is apparent that a need exists for a spacer which is capable of providing support between a transmission cable and a support wire along the length thereof which does not suffer from the disadvantages of water accumulation, and which does not cause unnecessary stress on cable ties and straps used in conjunction therewith.

SUMMARY OF THE INVENTION

It is an object of the present invention to provide an improved spacer which supports a cable, wire, conduit, or the like from a support member such as a support wire, cable, conduit or the like.

It is a further object of the present invention to provide a spacer which includes a substantially continuous cable contacting surface and which is does not accumulate water and ice in the interior thereof.

It is a further object of the present invention to provide a spacer which is capable of accommodating various size cables without added strain between the spacer and a cable tie used in conjunction therewith.

In the efficient attainment of these and other objects, the present invention provides an improved spacer for spacing an article such as a cable, wire, conduit, or other similar transmission means, from a support member such as a support wire, cable conduit or the like. The improved spacer has a spacer body which includes a support member contacting surface and an opposed cable supporting surface for supporting a cable continuously along the spacer body and along an extent of the cable. Drainage means, for example a plurality of drainage holes, extend through the spacer body for permitting drainage of water and the like from the interior of the spacer body, thereby preventing accumulation of water within the spacer body. In preferred embodiments, the spacer is of a generally rectangular shape with, drainage holes located in each of the four corners of the rectangular shaped spacer. Preferably, the support member contacting surface and the cable supporting surface are shaped for providing increased surface contact with the support member and the cable, respectively, for instance, by providing such surfaces in a v-shaped notch. The spacer is capable of effectively spacing the cable and the support member from each other and being contiguously secured between the spacer and the support member by way of a cable tie or the like surrounding the cable and the support member and about the spacer body, preferably passing through the spacer body by way of passageways extending through the spacer body.

In an alternative embodiment of the present invention, the spacer body includes side walls which extend along the length thereof, with the passageways extending through the spacer body at a location adjacent the side walls. Preferably, the passageways extend through a portion of the cable support surface and a portion of the side walls, creating side openings in communication with the passageways. In such an embodiment, when a cable tie is passed through the passageway for securing and spacing a cable from a support member, the cable tie can extend through the side opening, thereby accommodating larger diameter cables without causing added strain on the cable tie due to engagement or rubbing with a bottom surface of the spacer.

Preferably, the spacer of the present invention includes a generally rectangular shaped upper body portion and a generally rectangular shaped lower body portion, with the lower with the lower body portion having a smaller perimetrical shape than the upper body portion. As such, the spacer of the present invention is contemplated for use with a plurality of spacers in a stacked configuration, with the lower body portion of one spacer interlockingly engaging and upper portion of another spacer. With such a configuration, an inner surface of the side walls of the spacer body preferably include ribs thereon. When the spacers are used in a stacked configuration, the ribs of one spacer fill in the side opening of an adjacent stacked spacer, thereby permitting alignment of the passageways between adjacent spacers without obstruction of the inner surface between adjacent spacers.

DETAILED DESCRIPTION OF THE PREFERRED EMBODIMENTS

An improved spacer for spacing transmission cable or the like from a support member is shown in FIGS. 1–5. For purposes of the present invention, transmission cable is meant to include cable, wire, conduit, and any other means for transmission along a path as used in the art, for example, telephone and cable television transmission cables and fiber optic cables. The terms support member and support wire as used in the present invention are meant to include cable, wire, conduit, and any other type of such support used for suspending a transmission cable therefrom as known in the art, for example, those supports commonly referred to in the industry as messenger wires.

Figure 5:
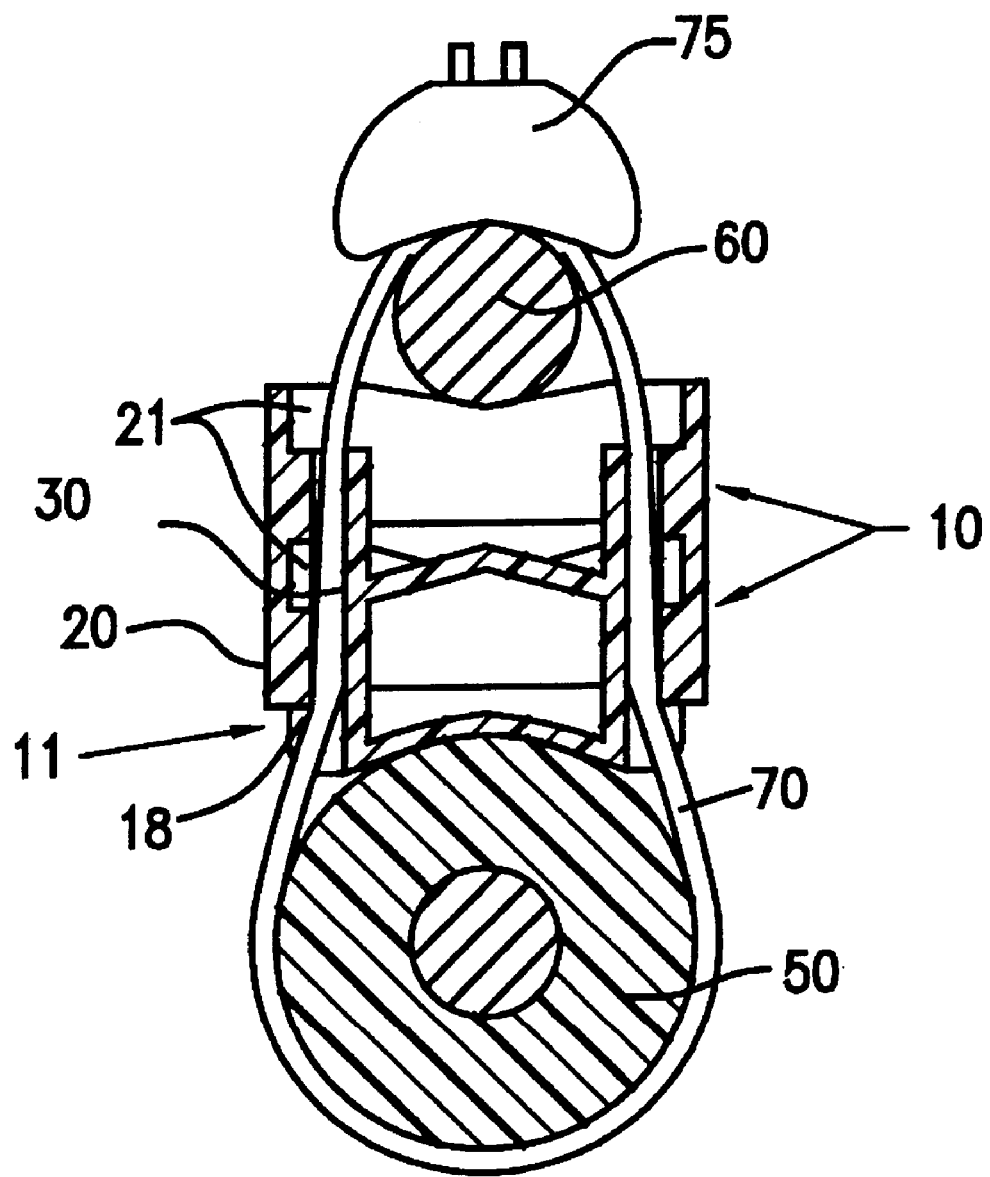
FIG. 5 is a cross-sectional view of a pair of cable spacers of the present invention shown in stacked relationship in a preferred use with a transmission cable and a support cable.

Spacer 10 is preferably formed of integrally molded thermoplastic construction, using various techniques as are well known in the art. As depicted in FIG. 5, spacer 10 is contemplated for use in conjunction with transmission cable 50 and support wire 60 with cable tie 70 extending through spacer 10 and surrounding transmission cable 50 and support wire 60, thereby supporting the elements in known fashion. Such a cable tie is disclosed in U.S. Pat. No. 5,193,251, incorporated herein by reference.

Referring more specifically to FIGS. 1–4, spacer 10 is of a generally parallelepiped shape including opposed top annular surface 23 and bottom surface 33, and includes upper body portion 20 and lower body portion 30. Upper body portion 20 includes upper side walls 24 and upper end walls 26 forming a generally rectangular shape. Lower body portion 30 includes lower side walls 34 and lower end walls 36, forming a generally rectangular shape. Upper body portion 20 and lower body portion 30 are integral to form spacer 10, with annular lip 15 annularly surrounding spacer 10 at a position where upper body portion 20 and lower body portion 30 meet. In preferred embodiments, cross member 16 is provided in the interior portion of spacer 10, for providing support for the body of spacer 10.

Upper body portion 20 is defined by opposing upper side walls 24a and 24b, opposing upper end walls 26a and 26b, and top annular surface 23. Top annular surface 23 includes support wire contacting surface 25 located at the upper portion of upper end walls 26. Support wire contacting surface 25 is provided for contact with a support wire 60, as will be described in further detail herein.

Figure 2:
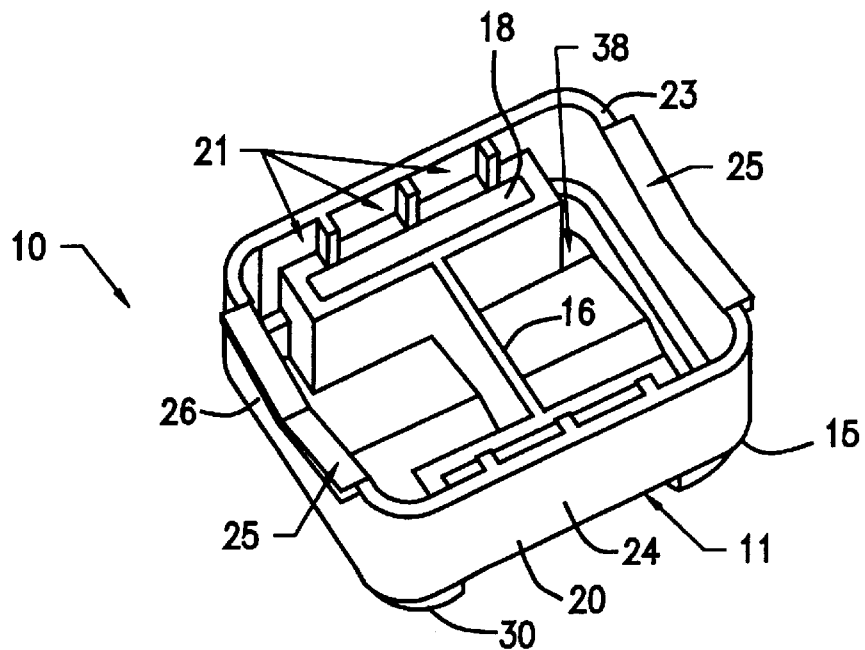
FIG. 2 is a perspective view of a cable spacer of the present invention shown with the support wire side facing up.
Figure 3:
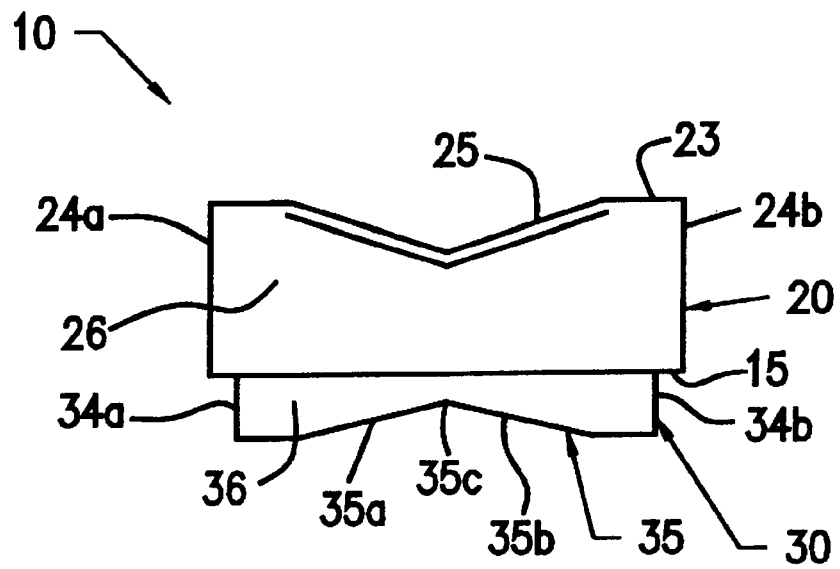
FIGS. 3 and 4 are end and side views, respectively, of a cable spacer of the present invention.
Figure 4:
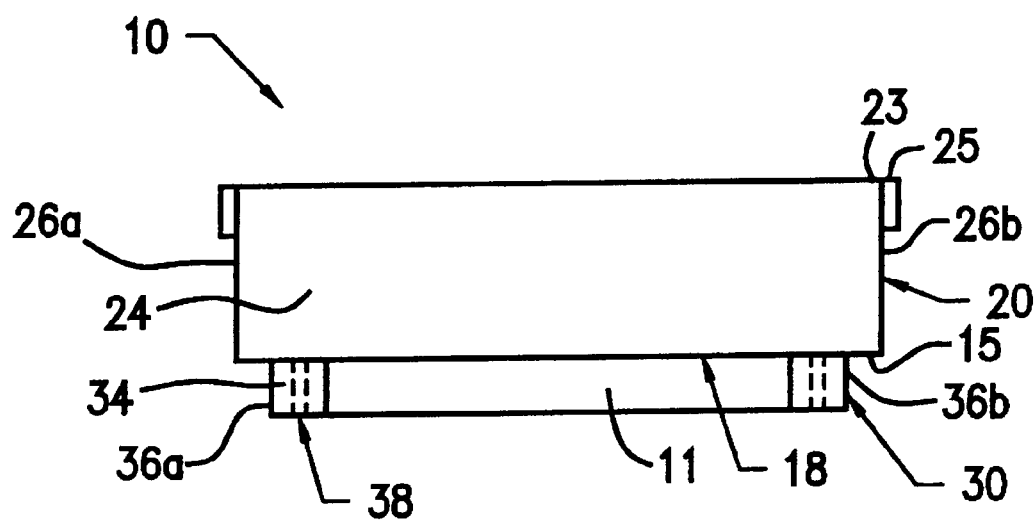

Support wire contacting surface 25 preferably protrudes over a portion of upper end walls 26 as can be seen in FIG. 2, to provide additional surface contact between spacer 10 and support wire 60. Further, support wire contacting surface 25 is preferably shaped to receive support wire 60 such that, when support wire 60 is of a generally tubular shape, increased surface contact between support wire contact surface 25 and support wire 60 is accomplished. Most preferably, such increased surface contact is provided by including support wire contacting surface 25 as a pair of v-shaped notches on top annular surface 23 adjacent each of upper end walls 26a and 26b, thereby forming a cradle-like accommodation for positional confinement of support wire 60.

Upper portion 20 of spacer 10 may further include ribs 21 positioned on an inner surface of upper side walls 24, as depicted in FIG. 2. Ribs 21 provide structural support for spacer 10, and are particularly useful for occupying side opening 11 when spacer 10 is used in a stacked relationship with additional spacers, as will be described in more detail herein.

Lower body portion 30 is defined by opposing lower side walls 34a and 34b, opposing lower end walls 36a and 36b, and bottom surface 33. Bottom surface 33 includes cable support surface 35. Cable support surface 35 is provided for contact with a transmission cable 50, as will be described in further detail herein.

Cable support surface 35 is provided for supporting transmission cable 50 continuously along the length of spacer 10 and along an extent of transmission cable 50. This is accomplished by providing cable support surface 35 as a continuous generally planar surface along the bottom of spacer 10. As noted above, in conventional spacers having an open configuration, any tightening of a support strap or cable tie around the cable can pull the cable into the internal portion of the spacer, thereby causing deformation of the housing surrounding the cable, and possibly damaging the cable. By providing cable support surface 35 with such a continuous surface, effective support of transmission cable 50 can be accomplished along the entire length of spacer 10 and along an extent of transmission cable 50, thereby preventing such deformation.

Further, cable support surface 35 is preferably shaped to receive transmission cable 50 such that, when transmission cable 50 is of a generally tubular shape, increased surface contact between cable support surface 35 and transmission cable 50 is accomplished. Most preferably, such increased surface contact is provided by including cable support surface 35 as a pair of planar surfaces 35a and 35b meeting at a central v-shaped recess 35c along the length of bottom surface 33, thereby forming a cradle-like accommodation for positional confinement of transmission cable 50.

Figure 1:
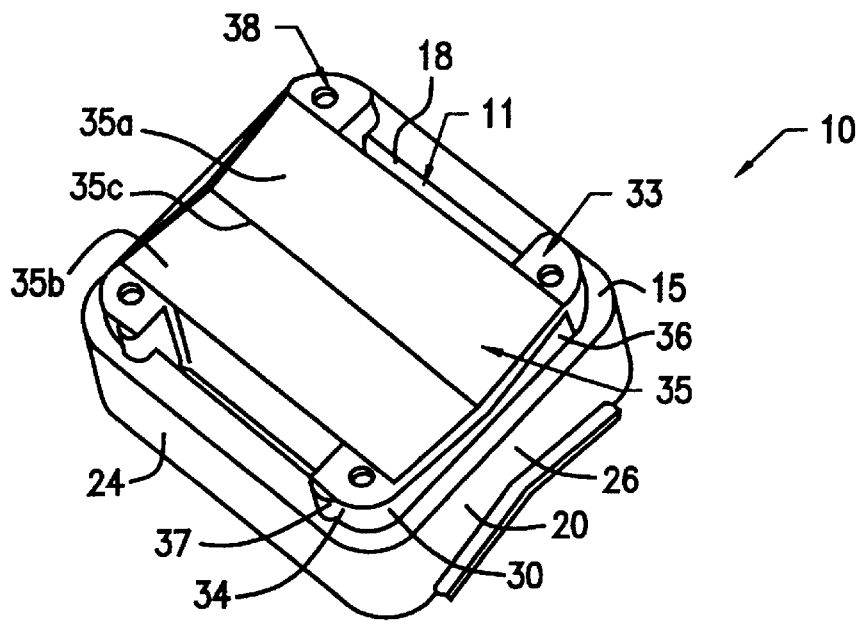
FIG. 1 is a perspective view of a cable spacer of the present invention shown with the transmission cable contacting side facing up.

While such continuous contacting surfaces are known in the art, the enclosed internal area created within spacer 10 by such a continuous bottom surface can be problematic. For instance, when such enclosed spacers are exposed to the elements in outdoor use, water, snow, ice and the like can accumulate within the internal area. In order to prevent such accumulation, spacer 10 is provided with drainage holes 38 extending therethrough. As best depicted in FIG. 1, drainage holes 38 extend through bottom surface 33 of spacer 10, for example, at a location adjacent cable contacting surface 35. By providing spacer 10 with such drainage holes 38, cable contacting surface 35 can be provided as a continuous surface, without suffering the disadvantages associated with such a continuous surface. In preferred embodiments, spacer 10 is provided with a plurality of drainage holes 38 extending through bottom surface 33. Any number of drainage holes can be utilized with the present invention, so long as the continuous nature of cable contacting surface 35 is not adversely affected by such drainage holes 38 in such a manner so as to cause unwanted deformation of transmission cable 50 as described hereinabove. In most preferred embodiments, four drainage holes 38 are provided extending through bottom surface 33 at a location in each of the four corners where lower side walls 34 and lower end walls 36 meet to form a generally rectangular shape. In such embodiments, adequate drainage of water through drainage holes 38 is provided through bottom surface 33 without disadvantageously effecting the continuous nature of cable support surface 35.

Spacer 10 is further provided with a support structure for a cable tie or strap, for example, by providing passageway 18 extending therethrough. Passageway 18 is provided for insertion of a cable tie or strap therethrough, in known fashion. A pair of passageways 18 are preferably provided through spacer 10 at opposite locations adjacent each of upper side walls 24a and 24b and lower side walls 34a and 34b. By providing passageways 18 in such a manner, cable tie 70 inserted through passageways 18 can effectively wrap around both transmission cable 50 and support wire 60 for providing effective support.

Further, with passageways 18 extending through spacer 10 at such locations adjacent upper side walls 24 and lower side walls 34, excessive stress can be placed on cable tie 70 as it passes through passageways 18 at bottom surface 33 and rubs against bottom surface 33, particularly when transmission cables having diameters larger than the width of spacer 10 are employed. In order to prevent such excessive stress, a portion of each of lower side walls 34a and 34b are removed to form side openings 11 therein, with side openings 11 in communication with passageways 18. With side openings 11 provided as such, cable tie 70 can extend through spacer 10 via passageways 18, and exit passageways 18 through side openings 11 at an angle capable of providing support around transmission cable 50 without excessive stress placed on cable tie 70 from rubbing against bottom surface 33. As such, larger diameter transmission cables can be accommodated.

Spacer 10 may preferably be provided with cross member 16 extending between upper side walls 24a and 24b. Cross member 16 provides added structural support for spacer 10.

In preferred applications, a plurality of spacers 10 can be used in a stacked configuration, with lower body portion 30 of one spacer 10 interlockingly engaging upper body portion 20 of another spacer 10. Such stacking of multiple spacers 10 is accomplished due to the relative sizes of upper body portion 20 and lower body portion 30, with upper body portion 20 having a generally rectangular shape and lower body portion 30 having a generally rectangular shape with a smaller perimetrical shape relative to upper body portion 20. As shown more clearly in FIGS. 3 and 4, lower side walls 34 and lower end walls 36 are of a shorter length than upper side walls 24 and upper end walls 26, thereby forming annular lip 15 at the juncture of upper body portion 20 and lower body portion 30. When used in a stacked configuration, lower body portion 30 of one spacer 10 interlockingly engages upper body portion 20 of another spacer 10 such that, annular lip 15 of the top spacer in such a stacked configuration matingly abuts top annular surface 23 of the bottom spacer, as depicted more clearly in FIG. 5.

Lower body portion 30 may further include projections 37 at spaced apart locations on lower side walls 34 and/or lower end walls 36. Projections 37 provide interference fit between lower portion 30 and upper portion 20 of adjacent spacers 10 when used in a stacked configuration.

When a plurality of spacers 10 are used in the aforementioned stacked configuration, passageways 18 of adjacent spacers 10 must align for communication therebetween, such that cable tie 70 can pass freely through each passageway 18 of adjacent spacers 10, as depicted in FIG. 5. In order to permit such free passage and aligning communication, ribs 21 are located such that ribs 21 of one spacer 10 fill in side opening 11 of an adjacent spacer 10. More specifically, when a plurality of spacers 10 are engaged in a stacked configuration, side opening 11 of lower portion 30 of one spacer 10 fits within the interior area of upper portion 20 of another spacer 10. When cable tie 70 is passed through passageways 18 of spacers 10, cable tie 70 may be obstructed from free passage between adjacent spacers 10 due to the alignment of side opening 11 of one spacer 10 with another spacer 10, in that side opening 11 engages a portion of the inner surface of upper side wall 24 of the other spacer 10. Cable tie 70 may therefore be obstructed from free passage through adjacent passageways 18 in that cable tie 70 may get caught on the inner surface of upper side wall 24 of an adjacent spacer 10 when cable tie 70 exits the first spacer 10 through side opening 11. With ribs 21 extending from the inner surface of upper side wall 24, however, ribs 21 of a bottom spacer 10 will partly fill in side opening 11 of a top spacer 10, thereby creating a continuous area for cable tie 70 to pass freely through adjacent passageways 18 without obstruction.

With reference now being made to FIG. 5, application of two spacers 10 of the present invention is depicted. Two spacers 10 are interlockingly engaged in a stacked configuration. Transmission cable 50 contacts cable support surface 35 of one of said stacked spacers 10, while support wire 60 contacts support wire contacting surface 25 of the other of stacked spacers 10. Cable tie 70 extends through passageways 18 of each of spacers 10, and exits passageway 18 of one of spacers 10 through side opening 11. Cable tie 70 surrounds each of transmission cable 50 and support wire 60, with cable tie head 75 connecting the ends of cable tie 70 to form a closed loop around transmission cable 50 and support wire 60. Cable tie 70 may be in any form known in the art, for example, a support strap.

When used in a stacked configuration as described herein, drainage holes 38 of one spacer 10 correspondingly align with drainage holes 38 of an adjacent spacer 10. With such a corresponding alignment, drainage through a plurality of stacked spacers 10 is accomplished through corresponding adjacent drainage holes 38.

While the present invention is described herein in terms of a preferred embodiment, it will be recognized by those skilled in the art various changes to the foregoing described and shown structures can be made without departing from the scope of the present invention. Accordingly, the particularly disclosed scope of the invention is set for the in the following claims.

What is claimed is:

1. A spacer for spacing a cable, from a support member, said spacer comprising:
    a spacer body having opposed end walls and including:
        a support member contacting surface;
        an opposed generally planar cable supporting surface extending continuously from one end wall of said spacer body to the opposite end wall of said spacer body, said cable supporting surface capable of supporting said cable continuously along the entire length of said spacer body and along an extent of said cable;
        drainage means extending through said spacer body; and
        cable tie support structure located on said spacer body,
        whereby said spacer is capable of being contiguously secured between the cable and the support member by way of a cable tie or the like surrounding said cable and supported by said cable tie support structure of said spacer body.

2. A spacer as in claim 1, wherein said drainage means includes said cable supporting surface including holes extending therethrough.

3. A spacer as in claim 2, wherein said spacer is generally rectangular in shape defining four corners and said holes are generally located in said corners.

4. A spacer as in claim 1, wherein said cable tie support structure includes a pair of passageways extending through said spacer body, said pair of passageways capable of accommodating said cable tie therethrough.

5. A spacer as in claim 4, wherein said passageways extend along a length of said spacer body.

6. A spacer as in claim 4, wherein said spacer body includes side walls extending along a length thereof, and wherein said passageways extend through a portion of said cable support surface and a portion of said side walls.

7. A spacer as in claim 1, wherein said cable supporting surface is generally v-shaped for accommodating said cable in a cradle like fashion along the entire length of said spacer body.

8. A spacer as in claim 1, wherein said spacer body includes a generally rectangular shaped upper portion and a generally rectangular shaped lower portion of smaller perimetrical shape relative to said upper portion, such that a plurality of spacers can be stacked, with said lower portion of one of said plurality of spacers interlockingly engaging said upper portion of another of said plurality of spacers.

9. A spacer for spacing a cable, from a support member, said spacer comprising:
    a generally rectangular shaped spacer body having side walls along a length thereof and including a generally rectangular shaped upper portion and a generally rectangular shaped lower portion of smaller perimetrical shape relative to said upper portion, such that a plurality of spacers can be stacked, with said lower portion of one of said plurality of spacers interlockingly engaging said upper portion of another of said plurality of spacers, said spacer body further including:
    a support member contacting surface;
    an opposed cable supporting surface capable of supporting said cable continuously along said spacer body and along an extent of said cable;
    a pair of passageways extending through said spacer body at a location adjacent said side walls and said cable supporting surface, said passageways further extending through a portion of said side walls forming side openings therein; and
    ribs on an inner surface of said side walls of said spacer body such that, when said plurality of spacers are stacked, said ribs of one of said plurality of spacers fills in said openings of another of said plurality of spacers,
    whereby said spacer is capable of being contiguously secured between the cable and the support member by way of a cable tie or the like surrounding said cable and said support member and extending through said passageways and said side openings.

* * * * *

UNITED STATES PATENT AND TRADEMARK OFFICE
CERTIFICATE OF CORRECTION

PATENT NO. : 6,129,317
DATED : October 10, 2000
INVENTOR(S) : Rodriguez et al.

It is certified that error appears in the above-identified patent and that said Letters Patent is hereby corrected as shown below:

On the cover, Attorney, Agent or firm, the printed patent incorrectly reads "Hoffman & Baron, LLP"; the patent should read - -Hoffmann & Baron, LLP- -.

At column 2 line 24, the printed patent incorrectly reads "and which is does not"; the patent should read - -and which does not- -.

At column 3, lines 5-6, the printed patent incorrectly reads "with the lower with the lower body portion"; the patent should read - -with the lower body portion- -.

At column 7, line 1, the printed patent incorrectly reads "is set for the in"; the patent should read - -is set forth in- -.

At column 7, line 26, the printed patent incorrectly reads "defining four comers and"; the patent should read - -defining four corners and- -.

UNITED STATES PATENT AND TRADEMARK OFFICE
CERTIFICATE OF CORRECTION

Page 2 of 2

PATENT NO. : 6,129,317
DATED : October 10, 2000
INVENTOR(S) : Rodriguez et al.

It is certified that error appears in the above-identified patent and that said Letters Patent is hereby corrected as shown below:

At column 7, line 27, the printed patent incorrectly reads "located in said comers"; the patent should read - -located in said corners- -.

Signed and Sealed this

Eighth Day of May, 2001

Attest:

NICHOLAS P. GODICI

Attesting Officer

Acting Director of the United States Patent and Trademark Office